United States Patent [19]

Takano et al.

[11] Patent Number: 4,909,222

[45] Date of Patent: Mar. 20, 1990

[54] FUEL INJECTING APPARATUS FOR INTERNAL COMBUSTION ENGINE

[75] Inventors: Yoshiya Takano, Katsuta; Yoshikazu Hoshi, Ibaraki, both of Japan

[73] Assignee: Hitachi, Ltd., Tokyo, Japan

[21] Appl. No.: 312,301

[22] Filed: Feb. 17, 1989

Related U.S. Application Data

[63] Continuation of Ser. No. 22,036, Mar. 5, 1987, abandoned.

[30] Foreign Application Priority Data

Mar. 5, 1986 [JP] Japan .................................. 61-46170

[51] Int. Cl.$^4$ ............................................ F02M 39/00
[52] U.S. Cl. .................................. 123/470; 123/52 M; 123/590
[58] Field of Search ......... 123/590, 470, 472, 52 MV, 123/52 ML, 52 MC, 52 M

[56] References Cited

U.S. PATENT DOCUMENTS

| | | | |
|---|---|---|---|
| 2,099,785 | 11/1937 | Willgoos | 123/52 M |
| 2,762,350 | 9/1956 | Mann et al. | 123/55 |
| 2,947,294 | 8/1960 | Bird et al. | 123/55 |
| 3,363,610 | 1/1968 | Massarotti | 123/52 |
| 3,635,201 | 1/1972 | High | 123/590 X |
| 3,877,449 | 4/1975 | High | 123/590 X |
| 4,100,905 | 7/1978 | Nolan | 123/590 X |
| 4,149,496 | 4/1979 | Palma | 123/470 |
| 4,318,371 | 3/1982 | McFarland | 123/52 M |
| 4,664,075 | 5/1987 | Poulos | 123/52 M |

FOREIGN PATENT DOCUMENTS

| | | | |
|---|---|---|---|
| 572390 | 3/1933 | Fed. Rep. of Germany | 123/52 M |
| 1601381 | 11/1970 | Fed. Rep. of Germany | |
| 1475880 | 4/1967 | France | |
| 569798 | 6/1945 | United Kingdom | 123/52 M |
| 631659 | 11/1949 | United Kingdom | |
| 696549 | 9/1953 | United Kingdom | |

Primary Examiner—Carl Stuart Miller
Attorney, Agent, or Firm—Antonelli, Terry & Wands

[57] ABSTRACT

A fuel injecting apparatus for an internal combustion engine, comprising a suction manifold and a throttle valve assembly connected to the suction manifold and provided with a fuel injector and a throttle valve. The plane of the opening of each branch pipe of the manifold is formed at a position receded downstream of a joining plane between the suction manifold and the throttle valve assembly to form space between the joining plane and the opening plane, and, at the same time, the branch pipes of the suction manifold are open at predetermined intervals around the central axis of the space which functions as part of a suction passage rotationally in the direction of the operating sequence of the integrated cylinders, whereby suction by each cylinder takes place consecutively in the same rotational direction in the space at the branch pipe inlets, and a swirl is generated at the space formed at the branch pipe inlets, thereby prompting the mixing of the fuel-air mixture and enabling uniform distribution of the mixture to each cylinder.

3 Claims, 5 Drawing Sheets

FUEL INJECTING APPARATUS FOR INTERNAL COMBUSTION ENGINE

This application is a continuation of application Ser. No. 022,036 filed on Nov. 5, 1987 now abandoned.

BACKGROUND OF THE INVENTION

The present invention relates to a fuel injecting apparatus for an internal combustion engine provided with a suction manifold and a throttle valve assembly connected to the suction manifold and having a fuel injector and a throttle valve, and, more particularly, to an improvement of the suction manifold.

In a conventional fuel injecting apparatus of this type known by, for instance, Japanese Patent Unexamined Publication No. 87856/1980, a measure is devised to allow a uniform fuel-air mixture to be distributed to each cylinder by providing a mixing chamber for prompting the mixing of fuel and air between a suction manifold and a throttle valve assembly.

In accordance with the aforementioned prior art, although there is an advantage in that the mixing of fuel and air becomes uniform, there has been the problem that the flow of mixture in the mixing chamber becomes irregular, so that stagnation of the mixture and irregularities in its density occur.

In addition, there has been another problem in that a mixing chamber of a large capacity has to be provided for mixing fuel and air.

SUMMARY OF THE INVENTION

Accordingly, an object of the present invention is to obtain a uniform distribution of a fuel-air mixture to each branch pipe without increasing the capacity and effective mixing action.

To this end, the present invention provides a fuel injecting apparatus for an internal combustion engine which is arranged such that the plane of the opening of each branch pipe of a suction manifold is formed at a position receded downstream of the joining plane between suction manifold and a throttle valve assembly to form space between the joining plane and the opening plane, and the branch pipes of the suction manifold are open at predetermined intervals around the central axis of the space which functions as part of a suction passage rotationally in the direction of the operating sequence of the integrated cylinders.

If this arrangement is made, suction of the mixture by each cylinder takes place sequentially in the same rotational direction in the space at the branch pipe inlet, so that a swirl is generated in this space, thereby prompting the mixing of the fuel-air mixture and enabling uniform distribution of the mixture to each cylinder. In addition, since the space can be formed by making use of the portion of the suction manifold which has hitherto been dead space, the volume or size of the overall apparatus is not increased. In addition, a swirl can be generated without providing a special member.

DESCRIPTION OF THE PREFERRED EMBODIMENTS

Figure 3:
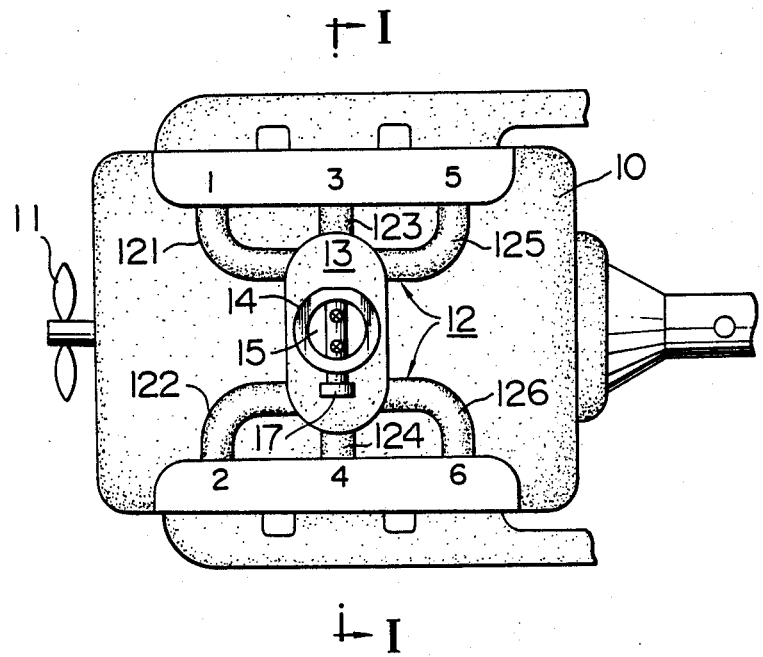
FIG. 3 is an overall schematic diagram of an internal combustion engine to which the present invention is applied.

FIG. 3 is a top plan view of a six-cylinder engine in accordance with an embodiment of the present invention. A cooling fan 11 is installed at the end portion of a six-cylinder engine 10. Furthermore, No. 1 to No. 6 cylinders are disposed on the six-cylinder engine 10 consecutively in two rows in the direction from the cooling fan 11 side, and each cylinder is denoted by numerals 1 to 6.

Figure 1:
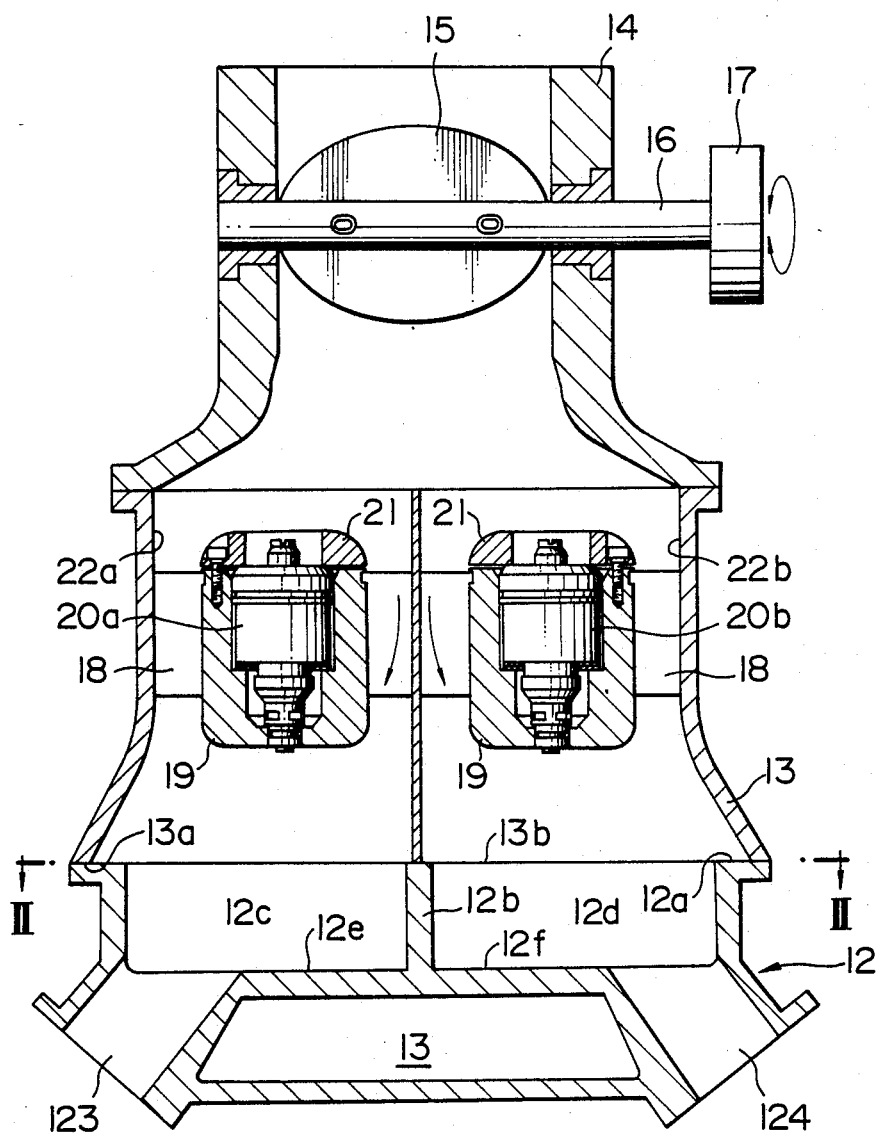
FIG. 1 is a diagram illustrating a suction device of a fuel injecting apparatus in accordance with the present invention.
Figure 2:
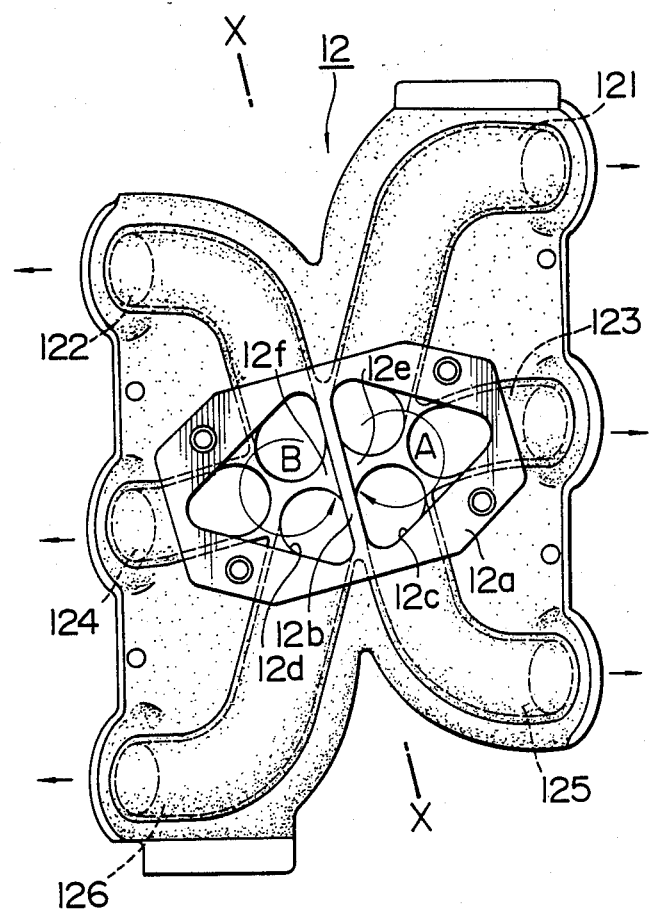
FIG. 2 is a cross-sectional view taken along the line II—II of FIG. 1.

FIG. 1 is a cross-sectional view taken along the line I—I of FIG. 3, while FIG. 2 is a cross-sectional view taken along the line II—II of FIG. 1. The same parts are denoted by the same reference numerals. An injector body 13 is disposed on the air suction-side end surface of a suction manifold, and a throttle valve body 14 on the upstream side. A throttle valve 15 for regulating the amount of sucked air is rotatably provided inside the throttle valve body 14. A throttle valve shaft 16 for fixing the throttle valve 15 extends outside the throttle valve body 14, and a hook 17 is provided at the end portion of the throttle valve shaft 16. The opening of this throttle valve 15 is increased or decreased in association with the operating condition of the six-cylinder engine 10, and this opening and closing operation is effected by the operator.

Holders 19 are secured inside the injector body 13 by means of three arms 18 disposed at equal intervals. Injectors 20a, 20b are respectively provided inside the holders 19 and are secured therein by means of upper covers 21.

As shown in FIG. 1, the injector body 13 is divided into two barrels, 22a, 22b, which are arranged independently of each other. Fuel is supplied from outside to the injectors 20a, 20b via fuel passages provided in the arms 18.

Figure 4:
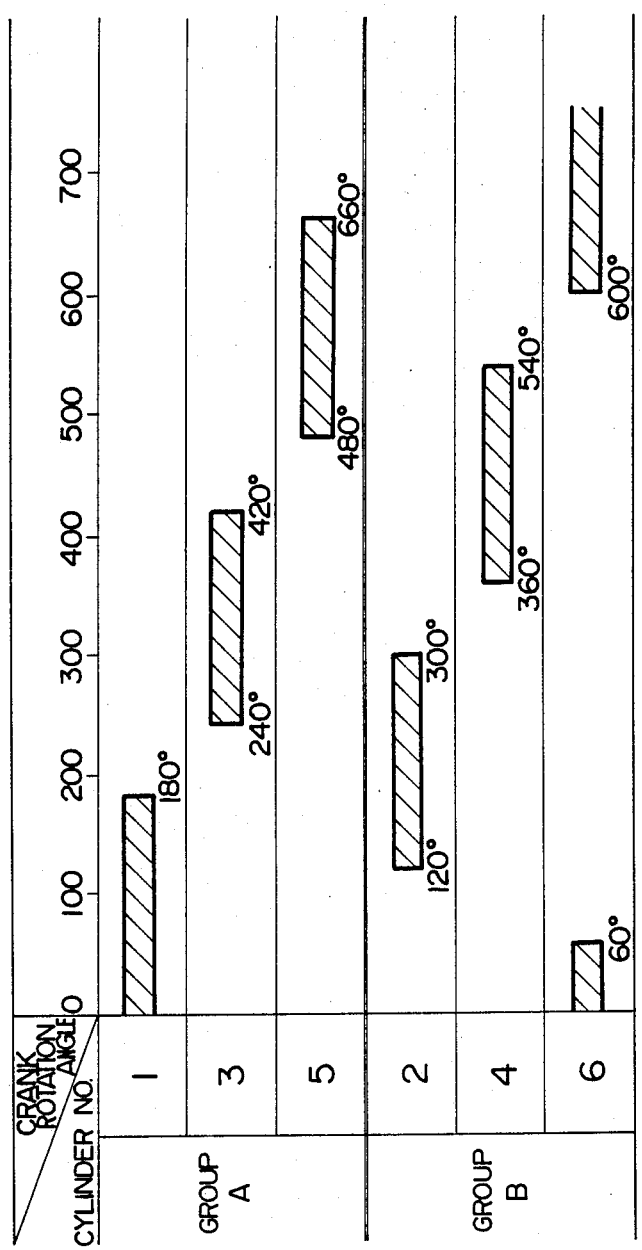
FIG. 4 is an explanatory process diagram.

FIG. 2 is a diagram illustrating the air suction-side end surface of the suction manifold 12, while FIG. 4 is a graph illustrating the process of the six-cylinder engine 10, and the shadowed portions indicate the suction process, the sequence of their operation being in the order of Nos. 1, 2, 3, 4, 5, and 6. However, as for the actual operation of the injector, the injector opens immediately before the shadowed portion and closes immediately after the shadowed portion, as is well known.

The suction manifold is divided into the following two groups: one including No. 1 cylinder, No. 3 cylinder, and No. 5 cylinder which are defined in Group A, and the other including No. 2 cylinder, No. 4 cylinder, and No. 6 cylinder which are defined in Group B. Each cylinder in the respective groups is disposed concentrically. When viewed from a fuel injection point, these cylinders assume symmetrical positions. In terms of the operational sequence, No. 1 cylinder first sucks the mixture, followed in order by No. 2 cylinder in Group B, No. 3 cylinder in Group A, No. 4 cylinder in Group B, No. 5 cylinder in Group A, and No. 6 cylinder in Group B. The arrangement is such that suction is carried out alternately by Groups A and B, and the sequence of suction is effected in rotation in each group. Accordingly, the flow of the sucked mixture always rotates clockwise in Group A and counterclockwise in Group B. Thus, the groups have a symmetrical structure of suction with respect to the branch point of each cylinder, so that unrestrained movement of air among cylinders is effected. Since the injector body 13 is provided between Groups A and B, the air in the groups becomes independent of each other and does not interfere each other. Furthermore, Groups A and B are symmetrical about the line X—X of FIG. 2. The sucked air from the upstream of the injectors 20a, 20b in Group A is always headed in the direction of No. 5 to No. 1 cylinder, while that in Group B, in the direction of No. 6 to No. 2 cylinder. When viewed from upstream of the injectors 20a, 20b, the air flows only in the same direction and factors disturbing air flow are eliminated.

Description will now be made of the flow of sucked air regulated by the throttle valve 15 and agitation of the same with injected fuel.

The sucked air which has been regulated by the throttle valve 15 is sucked into the barrels 22a, 22b of the injector body 13. Here, in terms of its arrangement, the throttle valve 15 is disposed in such a manner as to become symmetrical with Groups A and B shown in FIG. 2, i.e., in such a manner that the center line of the throttle valve shaft 16 becomes parallel with a direct line connecting the two injectors 20a, 20b, as shown in FIG. 1, this arrangement allows the streams of the sucked air with respect to Groups A and B to become symmetrical with each other.

Two recesses 12c, 12d partitioned by a partition wall 12b are formed in the suction manifold 12 downstream of the joining plane 13b between the sucked air intakeside end surface 12a of the suction manifold 12 and the lower end surface 13a of the injector body 13.

Branch pipes 121 to 123 and 124 to 126 are connected to and communicate with the bottom surfaces of these receses 12c, 12d.

The space formed by these recesses 12c, 12d between the joining plane 13b and surfaces 12e, 12f to which the branch pipes open and serve as the bottom surfaces of the recesses 12c, 12d imparts a stagnationfree circulating action to the fuel-air mixture passing therethrough.

This is because each branch pipe consecutively produces a suction process in the rotational direction, and imparts a swirl effect to the fuel-air-mixture inside the space. In other words, if a swirl occurs inside the space due to the suction action of one branch pipe, this large space allows the sucked mixture inside the space to undergo a swirl action even after the suction action of the branch pipe is completed.

Consequently, the mixture in the space can be adapted to the suction action of the adjacent branch pipe which subsequently takes place.

In addition, since a circulating flow is constantly produced in the space, the mixture fails to stagnate in the space, and the action of agitating the mixture in the space is effectively carried out during a pause when the suction action is not effected.

Fuel attached to the bottom surface of the space naturally evaporates due to the heat of hot water supplied to the inside of the hot water jacket 13, and prevents fuel from entering the branch pipe in the state of a liquid.

In accordance with this embodiment, this swirl has the advantage of making smooth the intermittent movement of sucked air to each cylinder, which is rotationally effected on the mixture inlet side of the suction manifold.

If fuel is injected from the injectors 20a, 20b at predetermined timings under the above-described condition of sucked air, the injected fuel is swirled into the swirling air flow without scattering to the outside and is sucked into a given cylinder while being mixed with air without fuel being attached to its wall surfaces. The movement to the next cylinder can be effected easily by virtue of the arrangement of the suction manifold 12 and the swirling flow, as described above, so that uniform supply of the mixture to each cylinder is possible.

In this embodiment, the space provided at the inlet of the suction manifold imparts a swirler effect to suction, it is possible to obtain the swirler effect without installing a special member.

Incidentally, although, in this embodiment, the injector is provided downstream of the throttle valve, the present invention can also be applied to a type in which a single injector is provided upstream of the throttle valve.

Description of a second embodiment of the present invention will be made hereafter with reference to FIGS. 5 to 7.

Figure 5:
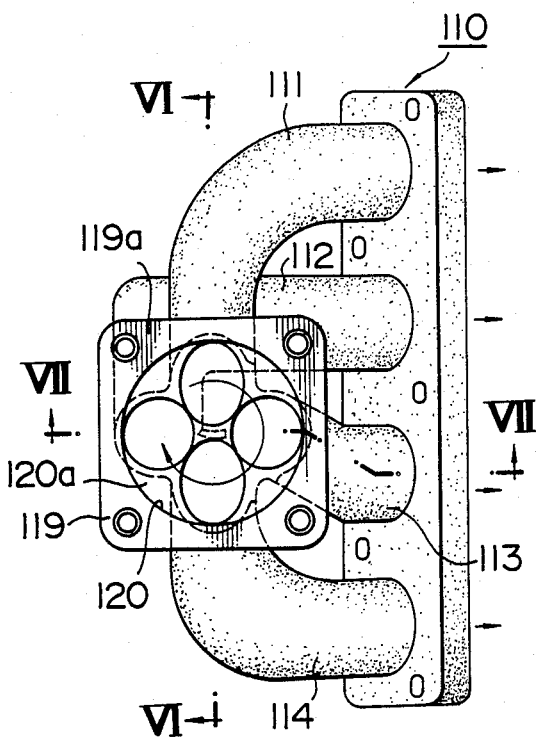
FIGS. 5 to 7 are diagrams illustrating another embodiment of the present invention.

FIG. 5 is a front elevational view of a suction manifold 110 of a four-cylinder engine in which the operation sequence is in the order of Nos. 1, 3, 4, and 2 cylinders.

A fuel injecting apparatus (not shown) is installed at a flange 119 formed at the sucked air intakeside end of the suction manifold. Branch pipes 111 to 114 from the respective cylinders are integrated at the inlet of the suction manifold, and are disposed rotationally in the direction of the operating sequence of the engine, as shown by the arrow. This integrating space formed between the joining plane of the flange 119 and the opening 120a of the branch pipe serves as space 120 for generating a circulating flow. Furthermore, the space 120 for generating this circulating flow and the respective engine cylinders are connected by means of the branch pipes 111 to 114.

Figure 6:
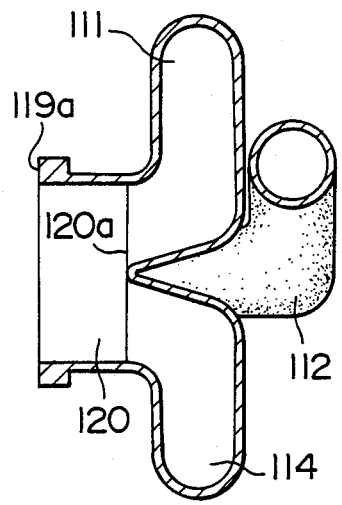
Figure 7:
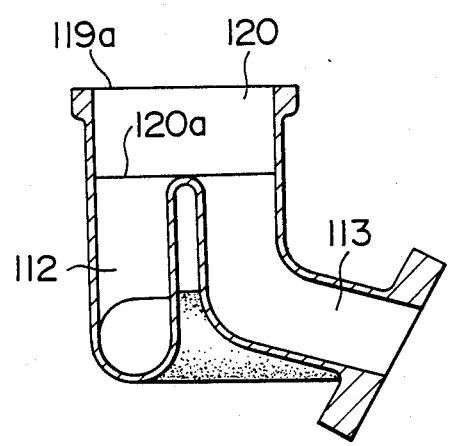

FIG. 6 is a cross-sectional view taken along the line VI—VI of FIG. 5, while FIG. 7 is similarly a cross-sectional view taken along the line VII—VII in FIG. 5. As is evident from FIGS. 6 and 7, the circulating flow-generating space 120 serves as integrating space for each cylinder, and the branch pipes 111 to 114 are connected to the respective engine cylinders from the downstream of the space 120.

Next, description will be made of operation. Let us first consider the suction process of No. 1 cylinder which is open to the circulating flow-generating space 120 which is integrated in such a manner that each process will not overlap. The next operation takes place in No. 3 cylinder, then followed by No. 4 cylinder and No. 2 cylinder in that order. The mixture sucking operation takes place in the direction of the arrow in the circulating flow-generating space 120. Accordingly, with respect to the fuel-air mixture in this circulating flow-generating space 120, a swirl occurs which moves in the direction of the arrow. Thanks to the generation of this swirl, the mixture in the circulating flow-generating space 120 is mixed uniformly, the distribution of the mixture to each cylinder is facilitated, and uniform distribution of the mixture is made possible, as in the case of the first embodiment.

Furthermore, since space is used as a means for generating this swirl effect, no resistance to suction is created at the time of a high-speed, high-load operation. In comparison with the method of generating a swirl by means of a swirler or the like, it is possible to reduce the suction resistance, and high-speed output can be improved.

Incidentaly, the operating sequence of the engine (not shown) should not be restricted to Nos. 1, 3, 4, and 2 cylinders, and it is apparent from the foregoing description that it suffices if the branch pipes connected to the circulating flow-generating space 120 are arranged rotationally in the direction of the operating sequence.

As described above, in accordance with the present invention, the branch pipes are integrated at the sucked air intake-side end of the suction manifold in such a manner that the same process will not overlap between the respective cylinders, the integrated branch pipes are disposed at predetermined intervals around the central axis of a suction passage rotationally in the direction of the operating sequence of the integrated cylinders, the plane of the opening of each branch pipe of the manifold is formed at a position receded downstream of a joining plane between the sucked air intake-side end surface of the suction manifold and the sucked air outlet-side end surface of the suction manifold, thereby to form circulating flow-generating space between the two planes. Consequently, it is possible to obtain effective mixing action for the mixture and uniform distributing action for the same by making effective use of the dead space of the suction manifold and without using any other member.

What is claimed is

1. A fuel injecting apparatus for an internal combustion engine, comprising a suction manifold with branch pipes, each having one end integrated into one opening and another of their ends connected to respective cylinders of the internal combustion engine, a throttle valve assembly being operatively connected to the opening of said suction manifold, a fuel injector assembly having at least one fuel injector being arranged upstream of the single opening and downstream of the throttle valve assembly and operated in such a manner that intake strokes of one cylinder will not substantially overlap respective intake strokes of the remainder of the cylinders in an operating sequence of the cylinders, a suction passage in the suction manifold having an opening adjacent an opening at one end of the throttle valve assembly and a straight wall portion defining a recess of sufficient length between the fuel injector assembly and the opening of said one end of each of said branch pipes for generating a swirling sucked flow of linearly moving fuel-air-mixture without fluid stagnation such that fuel from the fuel injector assembly is injected to a center of the suction passage, said one end of each of said branch pipes being disposed at predetermined intervals around the central axis of the suction passage rotationally in the direction of the operating sequence of the cylinders and open in a plane substantially parallel to a joining plane between said one opening of the suction manifold and the fuel injector assembly such that the plane of the opening of said one end of each said branch pipe is perpendicular to the swirling sucked flow of linearly moving fuel-air mixture in the recess formed at a position downstream of the joining plane between said suction manifold and fuel injector assembly, thereby forming a circulating flow-generating space between said planes and permitting air fuel mixture smoothly to enter the one end of each of the branch pipes in the operating sequence with linearly moving swirling flow.

2. A fuel injecting apparatus for an internal combustion engine according to claim 1, wherein the number of cylinders of said engine is an even number of 4 or greater, said branch pipes are divided into a group of the cylinders of odd numbers and a group of the cylinders of even numbers in terms of the operating sequence, a distribution passage is provided for distributing the fuel-air mixture to said each group of cylinders, and the branch pipe opening plane is recessed to the downstream side from the joining plane of said suction manifold.

3. A fuel injecting apparatus for, an internal combustion engine according to claim 2, wherein said fuel injector is disposed independently in said distribution passage.

* * * * *